United States Patent
Rahman et al.

(10) Patent No.: US 9,686,114 B2
(45) Date of Patent: Jun. 20, 2017

(54) APPARATUS, METHOD, AND COMPUTER PROGRAM FOR COMMUNICATING ONE OR MORE SYMBOLS WITH MULTIPLE PILOT SIGNALS AND NULLS

(71) Applicant: Futurewei Technologies, Inc., Plano, TX (US)

(72) Inventors: Syed Habib Rahman, Santa Clara, CA (US); Fan Wang, Wuhan (CN); Tao Ouyang, Wuhan (CN); Xiaoshu Si, Wuhan (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/752,705

(22) Filed: Jun. 26, 2015

(65) Prior Publication Data

US 2016/0380797 A1 Dec. 29, 2016

(51) Int. Cl.
*H04L 27/26* (2006.01)
*H04L 5/00* (2006.01)

(52) U.S. Cl.
CPC ........ *H04L 27/2637* (2013.01); *H04L 5/0048* (2013.01)

(58) Field of Classification Search
CPC ... H04L 25/08; H04L 25/085; H04L 27/2688; H04B 1/0475; H04B 1/10; H04B 1/1027; H04B 1/1036
USPC ....... 375/259, 260, 285, 316, 346, 350, 295, 375/296
See application file for complete search history.

(56) References Cited

U.S. PATENT DOCUMENTS

| | | | |
|---|---|---|---|
| 5,852,630 A * | 12/1998 | Langberg | H04L 27/2647 375/219 |
| 8,644,404 B2 * | 2/2014 | Mashino | H04J 11/0066 375/260 |
| 8,743,940 B1 * | 6/2014 | Venkataraman | H04L 25/03038 375/232 |
| 9,178,675 B2 * | 11/2015 | Kenney | H04L 5/005 |
| 2003/0031198 A1 * | 2/2003 | Currivan | H03M 13/2707 370/465 |
| 2004/0171366 A1 * | 9/2004 | Bar-Ness | H04L 25/022 455/278.1 |
| 2007/0070879 A1 * | 3/2007 | Yoshida | H04L 5/023 370/208 |
| 2007/0189403 A1 * | 8/2007 | Alletto | H04L 25/03159 375/260 |

(Continued)

FOREIGN PATENT DOCUMENTS

| | | |
|---|---|---|
| CN | 102333063 A | 1/2012 |
| CN | 102843324 A | 12/2012 |

OTHER PUBLICATIONS

CableLabs, "Data Over Cable Service Interface Specifications," DOCSIS 3.0, Physical Layer Specification, CM-SP-PHYv3.0-I08-090121, Jan. 21, 2009, pp. 1-161.

(Continued)

*Primary Examiner* — Siu Lee
(74) *Attorney, Agent, or Firm* — Zilka-Kotab, PC

(57) ABSTRACT

An apparatus, method, and computer program product are provided for communicating one or more symbols with multiple pilot signals and nulls. In use, one or more symbols are communicated including a plurality of pilot signals and a plurality of nulls, for use in generating a plurality of coefficients.

24 Claims, 12 Drawing Sheets

(56) References Cited

U.S. PATENT DOCUMENTS

| | | | |
|---|---|---|---|
| 2007/0243837 A1* | 10/2007 | Krishnamoorthi | H04L 1/206 455/115.1 |
| 2008/0123788 A1* | 5/2008 | Wongwirawat | H03G 3/3052 375/348 |
| 2008/0175330 A1* | 7/2008 | Jeon | H04B 17/345 375/260 |
| 2013/0022090 A1* | 1/2013 | Weng | H04L 25/03343 375/219 |
| 2014/0153673 A1* | 6/2014 | Shen | H04L 25/03318 375/320 |
| 2014/0254697 A1 | 9/2014 | Zhang et al. | |
| 2014/0328589 A1 | 11/2014 | Rahman et al. | |
| 2015/0146770 A1* | 5/2015 | Dore | H04L 25/0204 375/232 |
| 2015/0201422 A1* | 7/2015 | Jin | H04L 5/0048 370/252 |

OTHER PUBLICATIONS

International Search Report and Written Opinion from International Application No. PCT/CN2016/086949, dated Sep. 19, 2016.

* cited by examiner

APPARATUS, METHOD, AND COMPUTER PROGRAM FOR COMMUNICATING ONE OR MORE SYMBOLS WITH MULTIPLE PILOT SIGNALS AND NULLS

FIELD OF THE INVENTION

The present invention relates to orthogonal frequency-division multiplexing (OFDM) systems, and more particularly to symbol transmission in OFDM systems.

BACKGROUND

In certain communication systems (e.g. OFDM systems, etc.), a "probe" symbol is transmitted by a first station to a second station. Such "probe" symbol is typically an OFDM symbol with known pilots at each subcarrier. In use, the second station uses the received OFDM symbol for channel estimation and coefficient generation for a pre-equalizer located in the first station. Each coefficient of the pre-equalizer is associated with a distinct subcarrier. Unfortunately, a variety of noise often corrupts such OFDM symbols which, in turn, corrupts coefficient generation and subsequent data transfer.

Prior art FIG. 1 is frequency domain illustration 100 of an OFDM symbol 102 that is affected by ingress noise 104, in accordance with the prior art. Such upstream ingress noise 104, when present, occupies a subset of the subcarriers of the OFDM symbol 102. Typically, the ingress noise 104 affects the same subcarriers in all related OFDM symbols. Further, as mentioned earlier, the presence of the ingress noise 104 on a subcarrier corrupts the computed value of the pre-equalizer coefficient for that subcarrier. Unfortunately, the second station that receives the OFDM symbols 102 has no knowledge about the presence of the ingress noise 104 and which subcarriers of the OFDM symbols 102 are affected.

Prior art FIG. 2 is a time domain illustration 200 of an OFDM symbol 202 that is affected by burst noise 204, in accordance with the prior art. Such burst noise 204, when present, affects all the subcarriers of the OFDM symbol 202, corrupting the pre-equalizer coefficient for all the subcarriers. The burst noise 204 affects one or two (successive) OFDM symbols. Unfortunately, similar to the ingress noise 104, the second station that receives the OFDM symbol has no knowledge about the presence of the burst noise 202 in the OFDM symbols 202.

There is thus a need for addressing these and/or other issues associated with the prior art.

SUMMARY

An apparatus, method, and computer program product are provided for communicating one or more symbols with multiple pilot signals and nulls. In use, one or more symbols are communicated including a plurality of pilot signals and a plurality of nulls, for use in generating a plurality of coefficients.

BRIEF DESCRIPTION OF THE DRAWINGS

Prior art

Prior art

DETAILED DESCRIPTION

Figure 1:
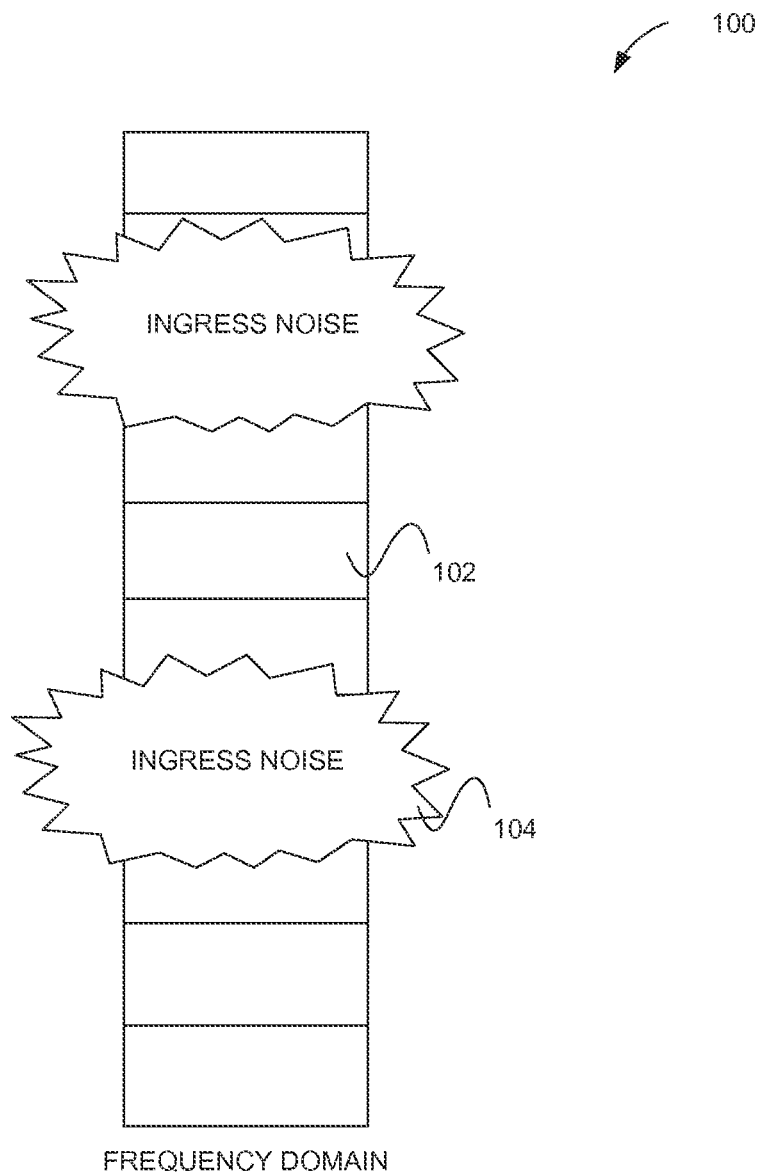
FIG. 1 is frequency domain illustration of an OFDM symbol that is affected by ingress noise, in accordance with the prior art.
Figure 2:
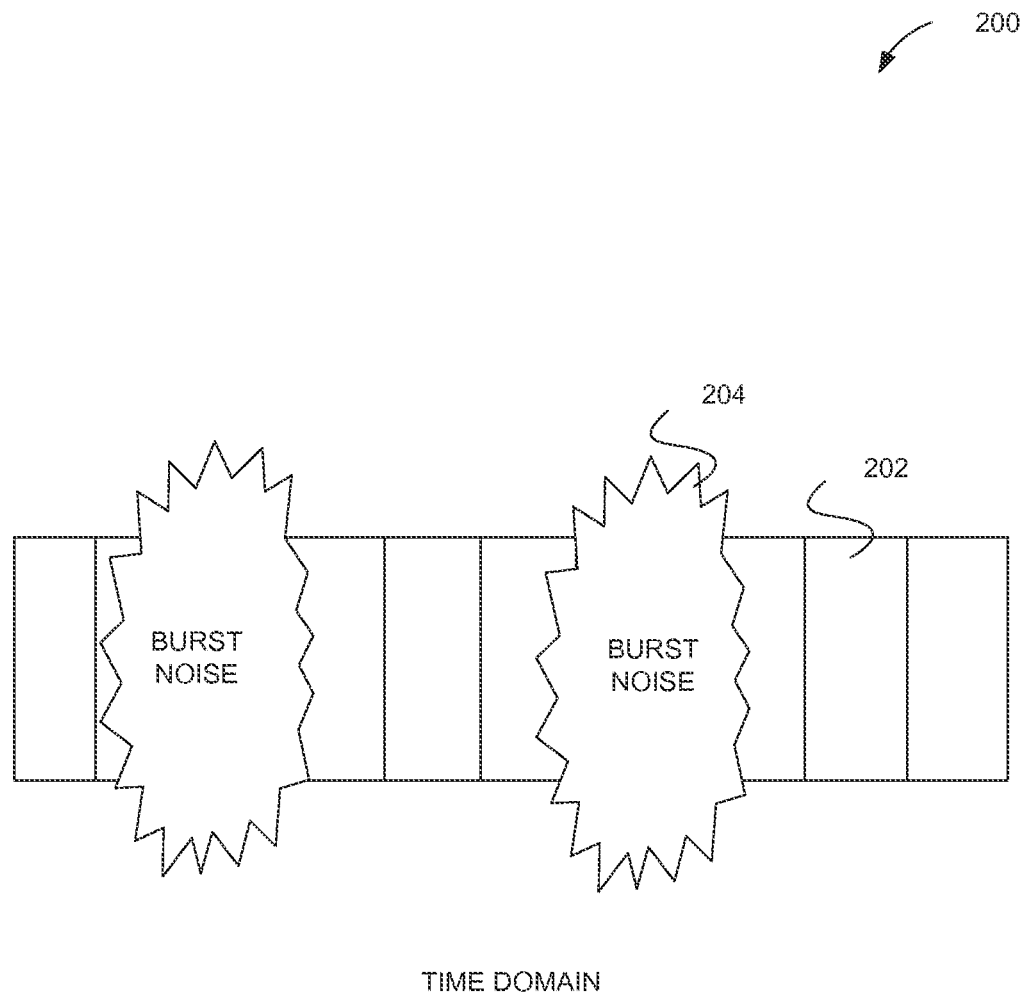
FIG. 2 is a time domain illustration of an OFDM symbol that is affected by burst noise, in accordance with the prior art.
Figure 3:
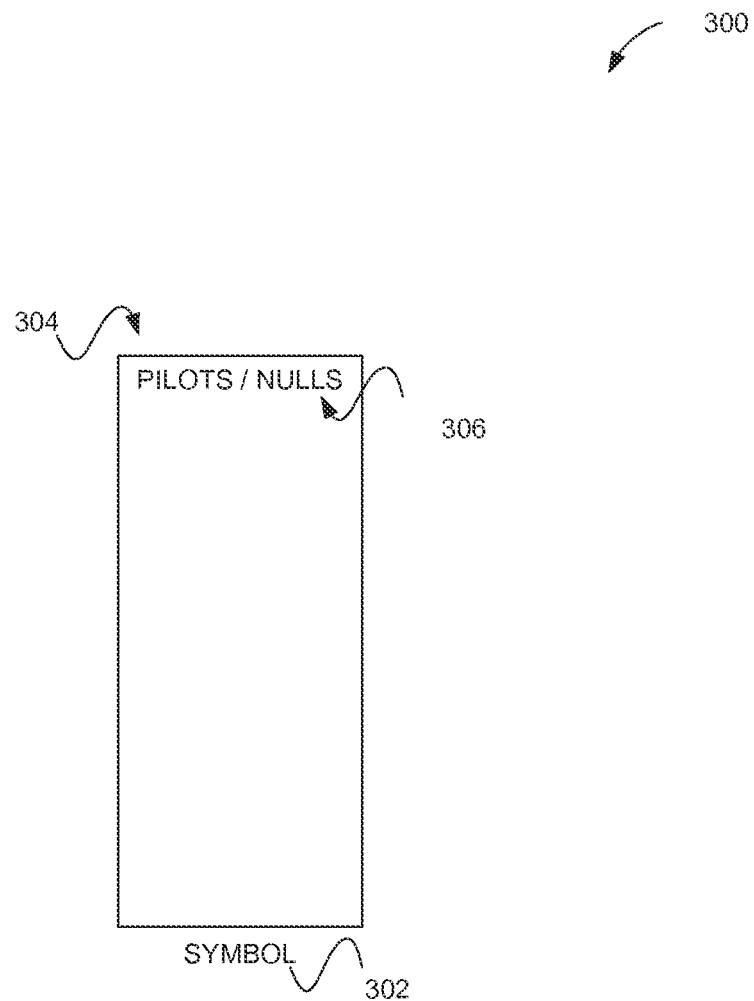
FIG. 3 illustrates a technique for communicating one or more symbols with multiple pilot signals and nulls, in accordance with one embodiment.

FIG. 3 illustrates a technique 300 for communicating one or more symbols with multiple pilot signals and nulls, in accordance with one embodiment. As shown, a symbol 302 is communicated that includes a plurality of pilot signals 304 and a plurality of nulls 306. While only one symbol 302 is shown in FIG. 3, it should be noted that, in other embodiments (some of which will be hereinafter described), more symbols may be utilized. Further, the term "communicated" is intended to refer to either transmitting and/or receiving. Thus, the symbol 302 may be transmitted by a transmitter and/or received by a receiver.

In the context of the present description, the symbol 302 may include any signal that is capable of including both the pilot signals 304 and the nulls 306. In one possible embodiment, the symbol may include a probe symbol and, more particularly, an orthogonal frequency-division multiplexing (OFDM) probe symbol. Of course, other modulation scheme symbols are contemplated. Just by way of example, the symbol may include an orthogonal frequency-division multiple access (OFDMA) probe symbol. Also, in the context of the present description, the aforementioned null may refer to any lack or sufficiently-reduced communication of energy that allows for a sufficient detection of noise.

As will soon become apparent during the description of subsequent embodiments, the symbol 302 is for use in generating a plurality of coefficients. In one embodiment, such coefficients may include equalizer coefficients or, more particularly, pre-equalizer coefficients. As will be described in the context of subsequent embodiments, one optional feature that may result from the symbol 302 including both the pilot signals 304 and the nulls 306, is an enhanced ability to detect and/or mitigate an effect of noise [e.g. ingress noise, burst (or impulse) noise, etc.] in connection with the foregoing generation of the coefficients.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
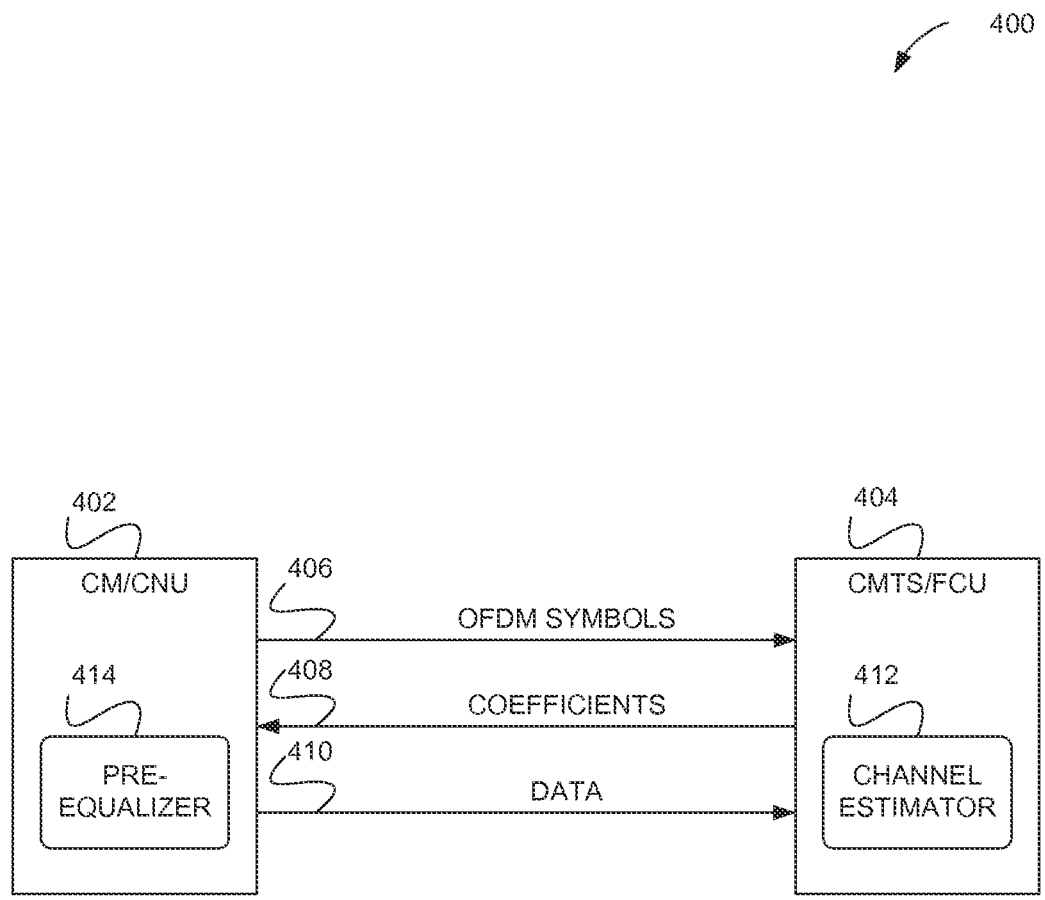
FIG. 4 illustrates a system for transmitting, receiving, and utilizing one or more symbols with multiple pilot signals and nulls, in accordance with one embodiment.

FIG. 4 illustrates a system 400 for transmitting, receiving, and utilizing one or more symbols with multiple pilot signals and nulls, in accordance with one embodiment. As an option, the system 400 may be implemented in the context of any one or more of the embodiments set forth in any previous and/or subsequent figure(s) and/or description thereof. Of course, however, the system 400 may be implemented in the context of any desired environment.

As shown, a first station 402 is included that is in communication with a second station 404. In various embodiments, the aforementioned communication may be wireless or wired (e.g. cable, etc.) communication. Further, the first station 402 may, in different embodiments, include a cable modem (CM) or a coax network unit (CNU), while the second station 404 may include a cable modem transmission system (CMTS) or a fiber coax unit (FCU), respectively. To this end, the system 400 may comply with relevant standards including, but not limited to Data Over Cable Service Interface Specification (DOCSIS) 3.1, Ethernet PON over Coax (EPoC), etc. Of course, such stations are set forth for illustrative purposes only and should not be construed as limiting in any manner whatsoever. For instance, the stations may include user equipment (UE) and a base station (enB), in other embodiments.

In use, the first station 402 transmits OFDM symbols 406 to the second station 404. As mentioned earlier, the OFDM symbols 406 are equipped with multiple pilot signals and nulls. The second station 404, in turn, utilizes the OFDM symbols 406 and, in particular, the pilots thereof, to calculate a plurality of pre-equalizer coefficients 408 and subsequently transmit the same to the first station 402. Further, as will be described hereinafter in greater detail, the nulls of the OFDM symbols 406 may be used to detect and/or mitigate an effect of noise that may corrupt the pilot signals of the OFDM symbols 406. To this end, the first station 402 may then utilize the pre-equalizer coefficients 408 to transmit data 410.

To accomplish this, the second station 404 includes a channel estimator 412 for calculating the pre-equalizer coefficients 408 based on the received OFDM symbols 406. Further, the first station 402 may include a pre-equalizer 414 for utilizing the received pre-equalizer coefficients 408 to prepare and transmit the data 410. While the aforementioned embodiment describes the transmission of symbols and calculation of coefficients in the context of an upstream framework, it should be noted that the techniques disclosed herein may be equally applied to downstream frameworks, as well.

Figure 5:
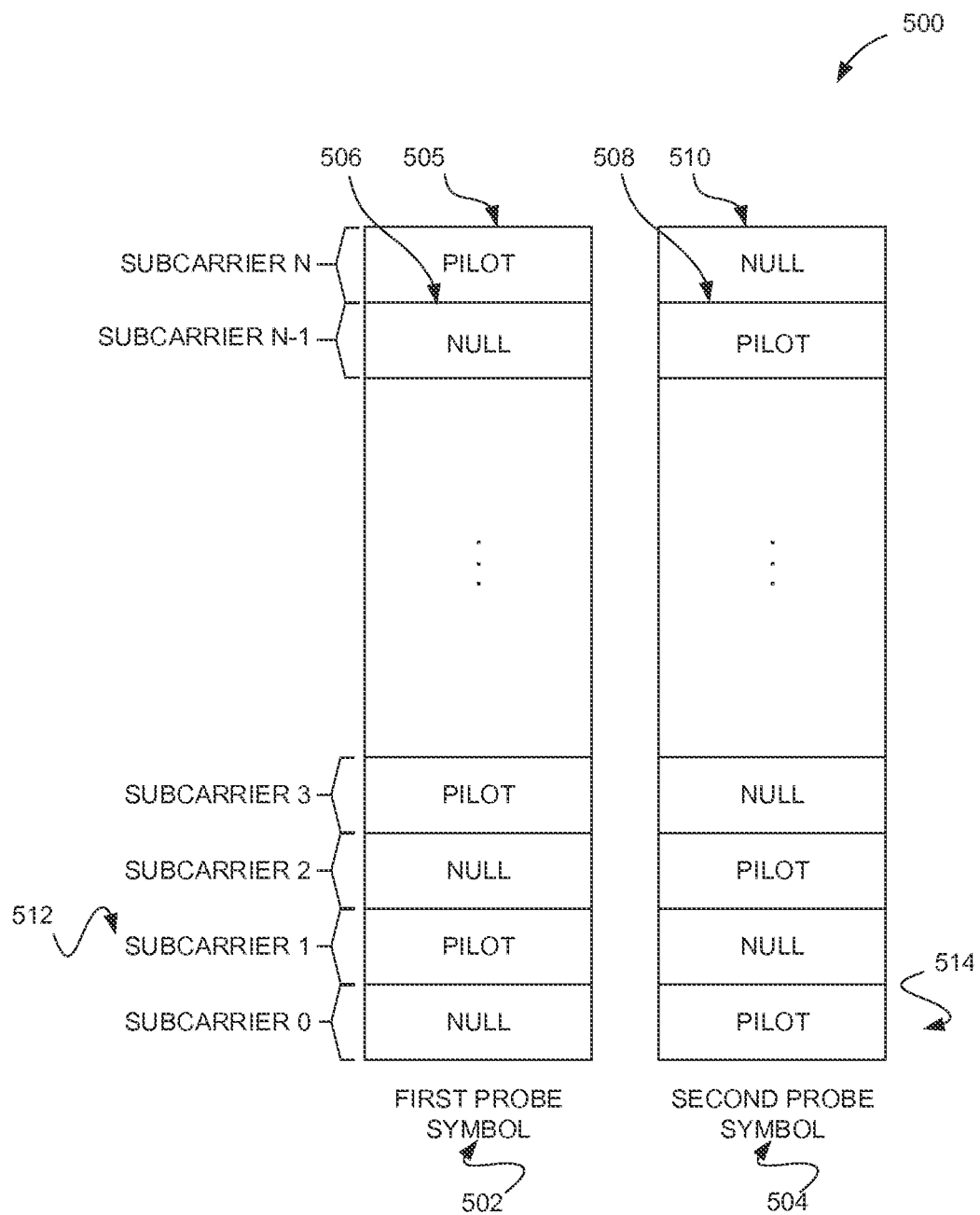
FIG. 5 illustrates a technique for communicating a plurality of symbols with multiple pilot signals and nulls, in accordance with one embodiment.

FIG. 5 illustrates a technique 500 for communicating a plurality of symbols with multiple pilot signals and nulls, in accordance with one embodiment. As an option, the technique 500 may be implemented in the context of any one or more of the embodiments set forth in any previous and/or subsequent figure(s) and/or description thereof. For example, the technique 500 may be implemented in the context of the system 400 of FIG. 4. Of course, however, the technique 500 may be implemented in the context of any desired environment.

As shown, at least two symbols are communicated including a first symbol 502 and a second symbol 504. The first symbol 502 includes a plurality of first pilot signals 505 and a plurality of first nulls 506. Further, the second symbol 504 includes a plurality of second pilot signals 508 and a plurality of second nulls 510. Still yet, the first pilot signals 505 of the first symbol 502 are communicated on a first set of subcarriers 512 and the second pilot signals 508 of the second symbol 504 are communicated on a second set of subcarriers 514. Specifically, the first set of subcarriers 512 may be odd subcarriers while the second set of subcarriers 514 may be even subcarriers. Of course, other embodiments are contemplated where the arrangement is opposite. Further, other arrangements are contemplated where the two probe symbols 502, 504 collectively transmit each subcarrier with both a corresponding null and pilot signal.

Thus, in one embodiment, the second set of subcarriers 514 are mutually exclusive with respect to the first set of subcarriers 512, in the manner shown. In other embodiments, the second set of subcarriers 514 may be at least partially mutually exclusive with respect to the first set of subcarriers 512. Further, while the first pilot signals 505/ nulls 506 and second pilot signals 508/nulls 510 are shown to alternate one-by-one in FIG. 5, it should be noted that other embodiments are contemplated whereby the first pilot signals 505/nulls 506 and second pilot signals 508/nulls 510 alternate using other patterns whereby the aforementioned mutual-exclusivity is maintained among the sub-carriers, at least in part.

As will soon become apparent, the use of such first symbol 502 and second symbol 504 with first pilot signals 505/nulls 506 and second pilot signals 508/nulls 510 patterned with at least some degree of mutual-exclusivity, enables the detection of various noise (e.g. ingress noise, burst noise, etc.) based on the nulls 506/510 utilizing any power, magnitude, or other detection technique. Further, the pilot signals 505/508 (which are unaffected by noise) may be utilized to generate pre-equalizer coefficients.

While not shown, at least one additional symbol may be communicated between the first symbol 502 and the second symbol 504. By this optional feature, it may be less likely for noise to corrupt both the first symbol 502 and the second symbol 504 by virtue of an increased temporal distance between the symbols (assuming noise varies as a function of time).

Figure 6:
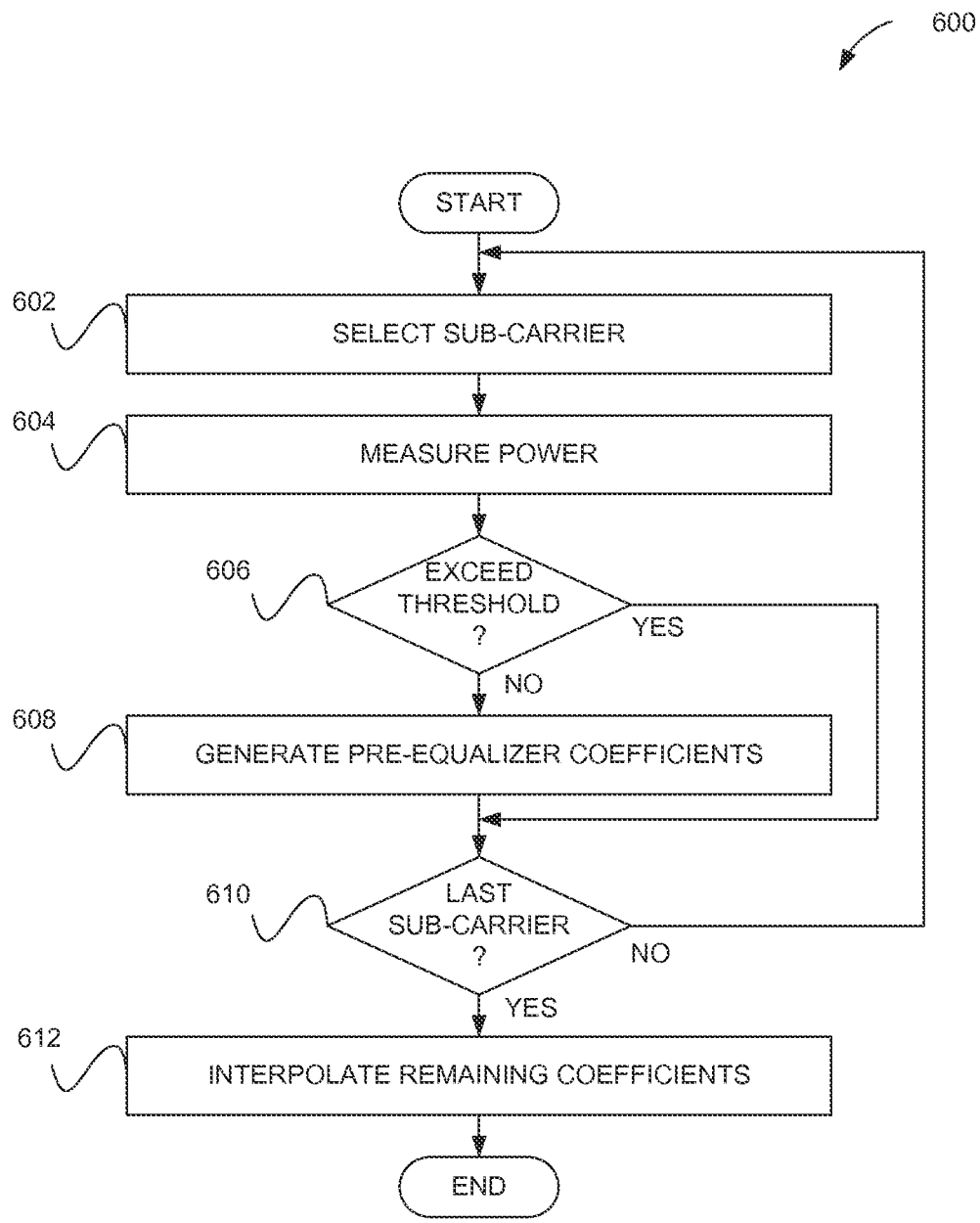
FIG. 6 illustrates a method for detecting/measuring ingress noise and calculating pre-equalizer coefficients using symbols with multiple pilot signals/nulls, in accordance with one embodiment.

FIG. 6 illustrates a method 600 for detecting/measuring ingress noise and calculating pre-equalizer coefficients using symbols with multiple pilot signals/nulls, in accordance with one embodiment. As an option, the method 600 may be implemented in the context of any one or more of the embodiments set forth in any previous and/or subsequent figure(s) and/or description thereof. Of course, however, the method 600 may be implemented in the context of any desired environment.

As shown in FIG. 6, for each of a plurality of subcarriers on which first nulls of a first symbol and second nulls of a second symbol (e.g. nulls 506/nulls 510 of FIG. 5, etc.) are communicated, it is determined whether a power exceeds a threshold. Specifically, as indicated in operation 602, a sub-carrier is selected over which a particular null has been communicated. Further, a power on such sub-carrier is measured. See operation 604.

It is then determined whether the power measured in operation 604 exceeds a predetermined threshold. See decision 606. If so, it is determined that ingress noise has been detected on such sub-carrier on which the null was transmitted via a first/second symbol, and pre-equalizer coefficients are not generated. On the other hand, if it is determined that the power measured in operation 604 does not exceed the predetermined threshold, the pre-equalizer coefficients are generated for the present sub-carrier utilizing the pilot signal for such sub-carrier that was transmitted via a second/first symbol. See operation 608.

The aforementioned method 600 continues until all of the sub-carriers have been processed such that, for each of a plurality of subcarriers on which the first pilot signals and the second pilot signals are communicated, corresponding coefficients are generated based on operations 602-608. Thereafter, the last sub-carrier is identified per decision 610. In such case, the remaining coefficients (which were not generated due to ingress noise detection) are interpolated using the coefficients that were indeed generated.

Figure 7:
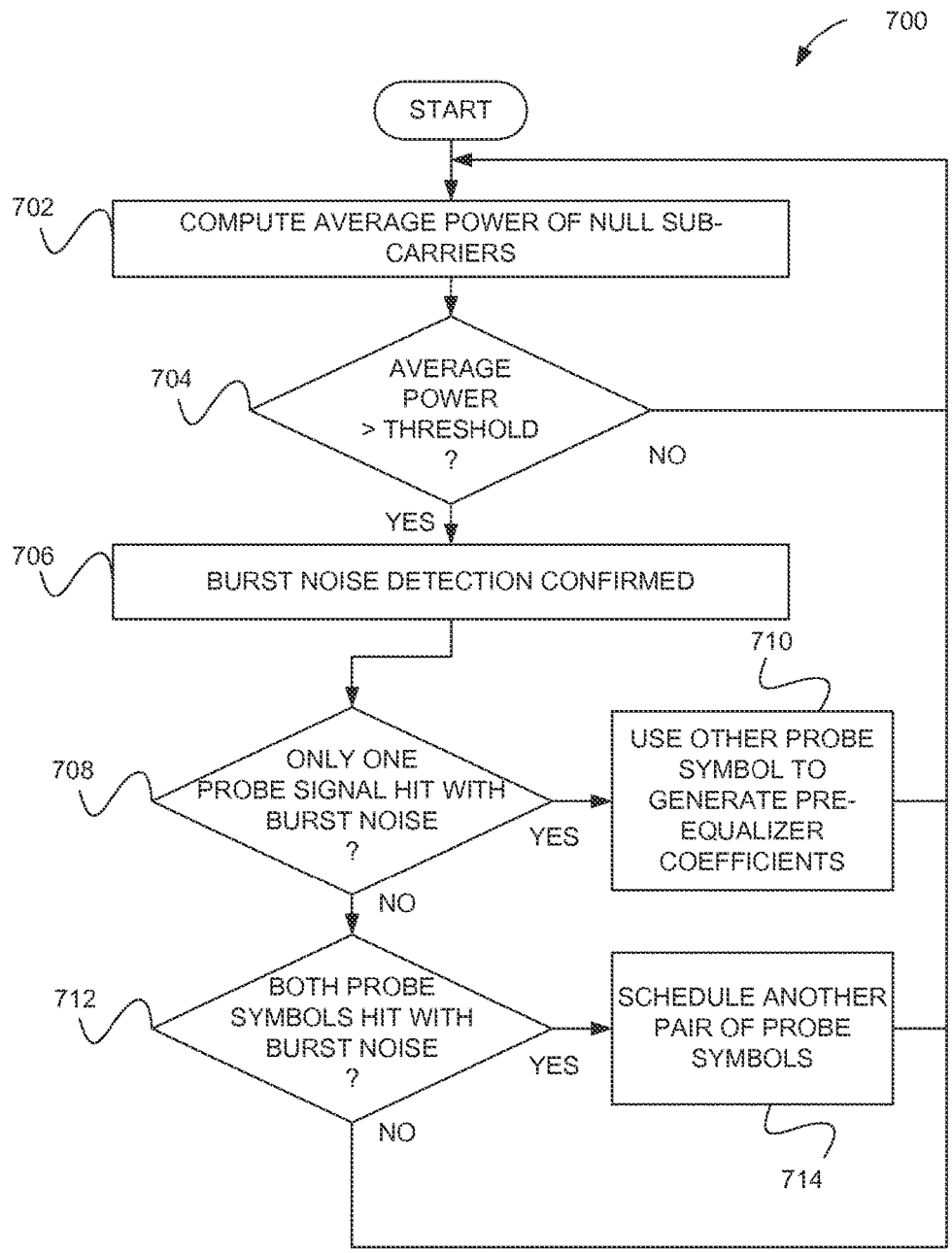
FIG. 7 illustrates a method for detecting/measuring burst noise and calculating pre-equalizer coefficients using symbols with multiple pilot signals/nulls, in accordance with one embodiment.

FIG. 7 illustrates a method 700 for detecting/measuring burst noise and calculating pre-equalizer coefficients using symbols with multiple pilot signals/nulls, in accordance with one embodiment. As an option, the method 700 may be implemented in the context of any one or more of the embodiments set forth in any previous and/or subsequent figure(s) and/or description thereof. Of course, however, the method 700 may be implemented in the context of any desired environment.

As shown in FIG. 7, for all subcarriers on which first nulls of a first symbol and second nulls of a second symbol (e.g. nulls 506/nulls 510 of FIG. 5, etc.) are communicated, an average power is measured to detect burst noise. Specifically, after power for each null sub-carrier is measured, an average power is computed. See operation 702. It is then determined whether such average power exceeds a threshold. See decision 704.

Only in a case where it is determined that the average power exceeds a power threshold per decision 704, burst noise detection is confirmed. See operation 706. In such case, it determined whether the first symbol and/or the second symbol are affected by burst noise. Further, if only the first symbol is affected by burst noise, the coefficients are generated based on the second symbol (and visa-versa). See decision 708 and operation 710. Still yet, if both the first symbol and the second symbol are affected by burst noise, a request is initiated for the first symbol and the second symbol to be communicated again, by scheduling the same. See decision 712 and operation 714.

Figure 8:
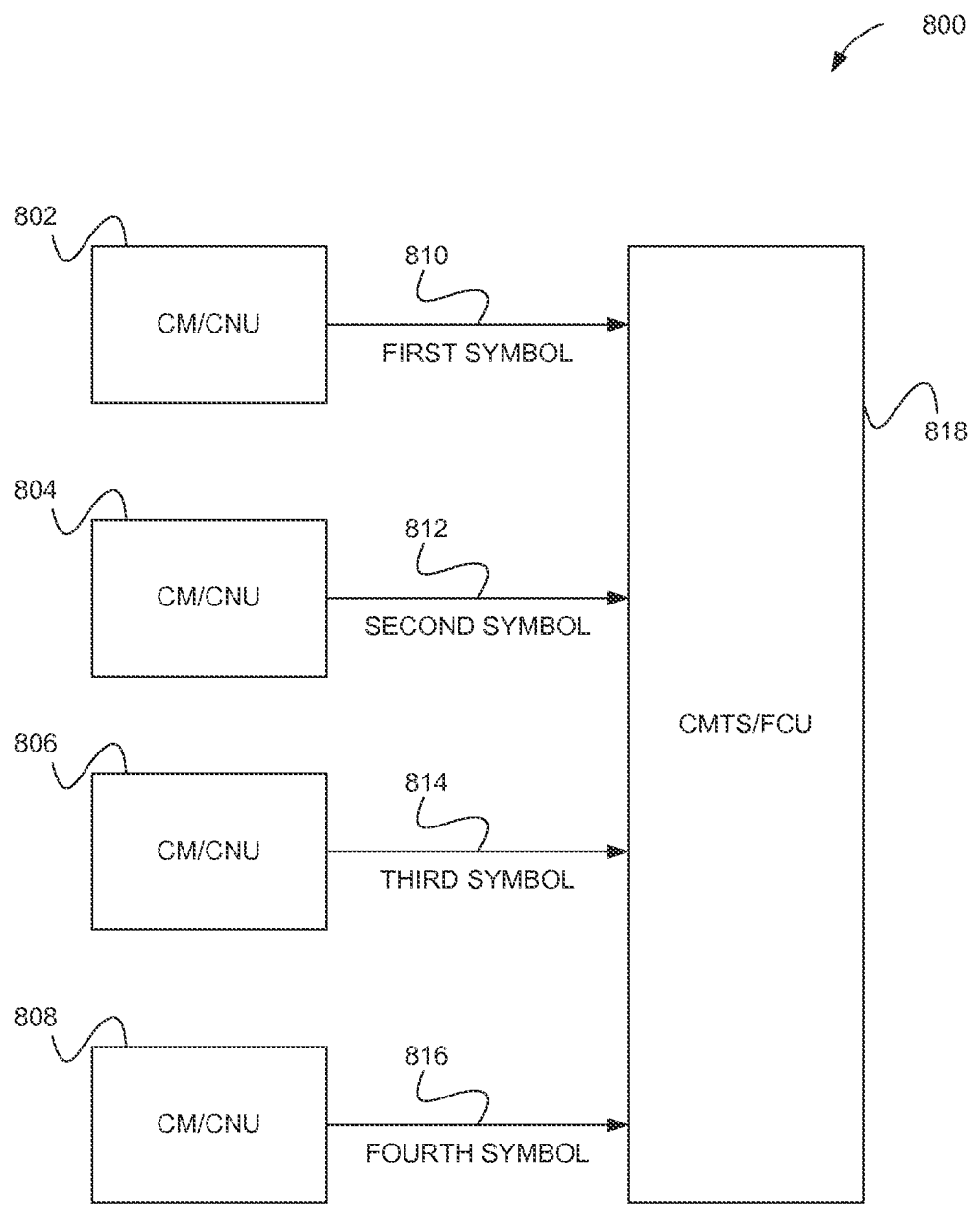
FIG. 8 illustrates a system for transmitting, receiving, and utilizing at least four symbols with multiple pilot signals and nulls, in accordance with one embodiment.

FIG. 8 illustrates a system 800 for transmitting, receiving, and utilizing at least four symbols with multiple pilot signals and nulls, in accordance with one embodiment. As an option, the system 800 may be implemented in the context of any one or more of the embodiments set forth in any previous and/or subsequent figure(s) and/or description thereof. Of course, however, the system 800 may be implemented in the context of any desired environment.

As illustrated in FIG. 8 and unlike the system 400 of FIG. 4, four different stations 802, 804, 806, 808 are included which each communicate separate OFDM symbols 810, 812, 814, 816 to a second station 818. As mentioned earlier, in various embodiments, the aforementioned communication of OFDM symbols 810, 812, 814, 816 may be over a wireless or wired (e.g. cable, etc.) communication medium. Further, the four different stations 802, 804, 806, 808 may, in different embodiments, include a cable modem (CM) or a coax network unit (CNU), while the second station 818 may include a cable modem transmission system (CMTS) or a fiber coax unit (FCU), respectively. Of course, such stations are set forth for illustrative purposes only and should not be construed as limiting in any manner whatsoever. Again, the stations may include user equipment (UE) and a base station (enB), in another embodiment.

As will soon become apparent, the use of separate stations 802, 804, 806, 808 to communicate four separate OFDM symbols 810, 812, 814, 816, enables enhanced detection and mitigation of noise (e.g. ingress, burst, etc. noise).

Figure 9:
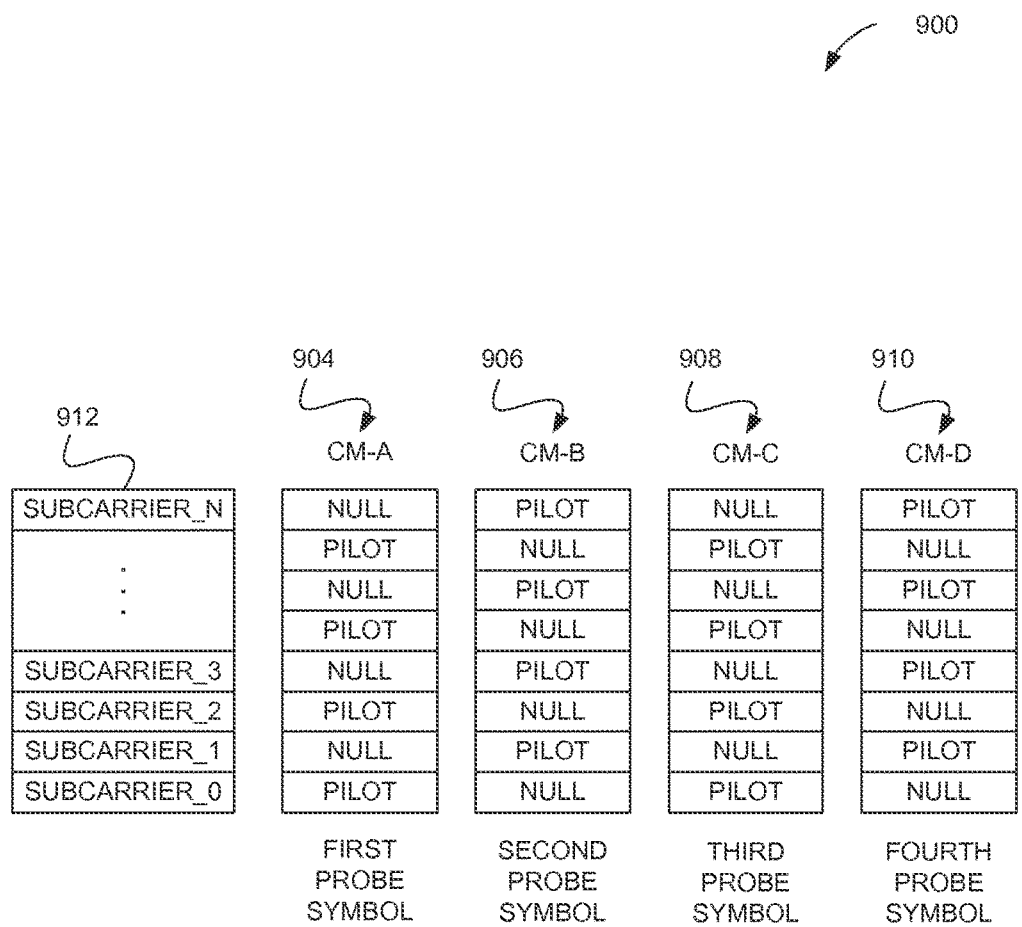
FIG. 9 illustrates a technique for communicating at least four symbols with multiple pilot signals and nulls, in accordance with one embodiment.

FIG. 9 illustrates a technique 900 for communicating at least four symbols with multiple pilot signals and nulls, in accordance with one embodiment. As an option, the technique 900 may be implemented in the context of any one or more of the embodiments set forth in any previous and/or subsequent figure(s) and/or description thereof. For example, the technique 900 may be implemented in the context of the system 800 of FIG. 8. Of course, however, the technique 900 may be implemented in the context of any desired environment.

As shown, at least four symbols are communicated via at least four different sources (e.g. stations 802, 804, 806, 808 of FIG. 8, etc.). Specifically, such four symbols include a first symbol 904 including a plurality of first pilot signals and a plurality of first nulls, a second symbol 906 including a plurality of second pilot signals and a plurality of second nulls, a third symbol 908 including a plurality of third pilot signals and a plurality of third nulls, and a fourth symbol 910 including a plurality of fourth signals and a plurality of fourth nulls.

Further, for each symbol, the corresponding pilot signals and nulls are each transmitted over a predetermined one of a plurality of sub-carriers 912. Specifically, the configuration of the pilot signals/nulls on the different sub-carriers 912 is such that, for adjacent symbols, a pilot signal occupies one sub-carrier 912 for one symbol, while a null occupies such one sub-carrier 912 for another adjacent symbol. While a specific alternating one-by-one configuration is shown in FIG. 9 to adhere to such principle, it should be strongly noted that any other configuration may be used as well, such that the aforementioned principle and/or some degree of mutual exclusivity is maintained, at least in part. Just by way of example, the pattern may very well be altered such that the pilot signals/nulls for each symbol alternate two-by-two, three-by-three, N-by-N; such that an adjacent symbol is patterned the same, but in a staggered manner, to maintain mutual exclusivity.

Figure 10:
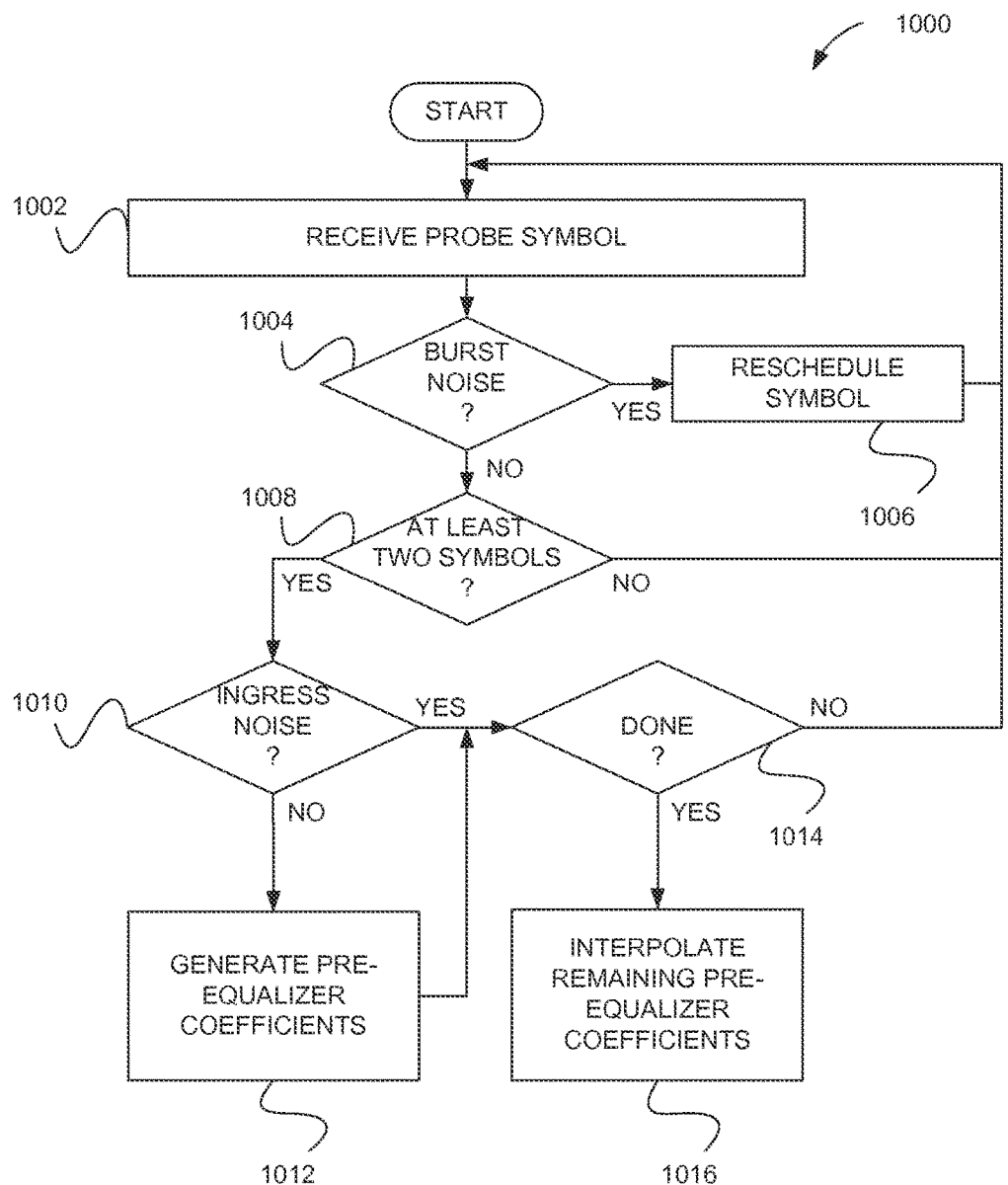
FIG. 10 illustrates a method for detecting/measuring ingress and burst noise and calculating pre-equalizer coefficients using at least four symbols with multiple pilot signals/nulls, in accordance with one embodiment.

FIG. 10 illustrates a method 1000 for detecting/measuring ingress and burst noise and calculating pre-equalizer coefficients using at least four symbols with multiple pilot signals/nulls, in accordance with one embodiment. As an option, the method 1000 may be implemented in the context of any one or more of the embodiments set forth in any previous and/or subsequent figure(s) and/or description thereof. For example, the method 1000 may be implemented in the context of the embodiments shown in FIGS. 8-9. Of course, however, the method 1000 may be implemented in the context of any desired environment.

As shown, for each probe symbol (of four) received in operation 1002, it is determined whether burst noise has been detected such that the symbol is affected by the same. See decision 1004. If so, the symbol affected by the burst noise is rescheduled to be re-sent. See operation 1006.

On the other hand, if it is determined that the received probe symbol is not affected by burst noise, decision 1008 is carried out for sufficient iterations of operations 1002-1006 until it is determined that at least two symbols have been received which are unaffected by burst noise. Once that is the case, it is determined in decision 1010 whether one or more of the subcarriers are affected by ingress noise, utilizing two or more of the at least four symbols that are determined to be unaffected by the burst noise (per decision 1008). To this end, based on decision 1010, pre-equalizer coefficients may be generated for the subcarriers unaffected by ingress noise, for each of the symbols unaffected by the burst noise. See operation 1012.

Further, assuming all of the symbols have been received per decision 1014, the remaining pre-equalizer coefficients may be generated by way of interpolation, based on the previously-generated pre-equalizer coefficients that were generated utilizing the symbols that were unaffected by any noise. See operation 1016.

In the foregoing embodiments, an average power or magnitude of the null subcarriers (excluding ingress affected subcarriers) is used to detect burst noise. In one or more of such embodiments, sensitivity of ingress noise detection may be augmented in the range of $>=-20$ dBc. Further, sensitivity of burst noise detection may be augmented in the range of $>=-10$ dBc.

In other embodiments, an average modulation error ratio (MER) of a set of pilot subcarriers (excluding ingress affected subcarriers) may be used. In order to compute subcarrier MERs, the receiver may first compute pre-equalizer coefficients of the pilot subcarriers of the first probe symbol. Then, using these computed equalizer coefficients, the pilot subcarriers of the second probe symbol may be equalized. To this end, the receiver may compute the MER for the equalized pilot subcarriers of the second probe symbol. For example, if the first probe symbol has pilots on all even subcarriers and the second probe symbol has pilots on all odd subcarriers, the computed equalizer coefficients of subcarriers 0, 2, 4, 6 . . . , N of the first probe symbol may be used to equalize the subcarriers 1, 3, 5 . . . , N-1, respectively, of the second probe symbol.

In another embodiment, the receiver may choose to schedule two probe symbols with all pilot subcarriers, without any nulls. In this embodiment, the receiver may solely use subcarrier MERs to detect the presence of ingress and/or burst noise. Degradation in MER of only a subset of subcarriers, may indicate the presence of ingress on those subcarriers. A degradation in MER of all subcarriers may indicate the presence of burst noise.

In summary, in the context of such alternate embodiment, a first symbol may be received including a plurality of first pilot signals associated with first subcarriers. Next, coefficients may be generated for the first subcarriers, utilizing the first pilot signals of the first symbol. A second symbol is also received including a plurality of second pilot signals associated with second subcarriers. To this end, the second subcarriers may be equalized, based on the coefficients generated utilizing the first pilot signals of the first symbol. As mentioned earlier, a MER may be calculated for the equalized second subcarriers. In use, ingress noise detection may be confirmed if only a subset of the second subcarriers has a MER less than a predetermined amount (e.g. MER is poor, etc.). Further, burst noise detection may be confirmed if all of the second subcarriers of the second symbol has a MER less than a predetermined amount (e.g. MER is poor, etc.).

Figure 11:
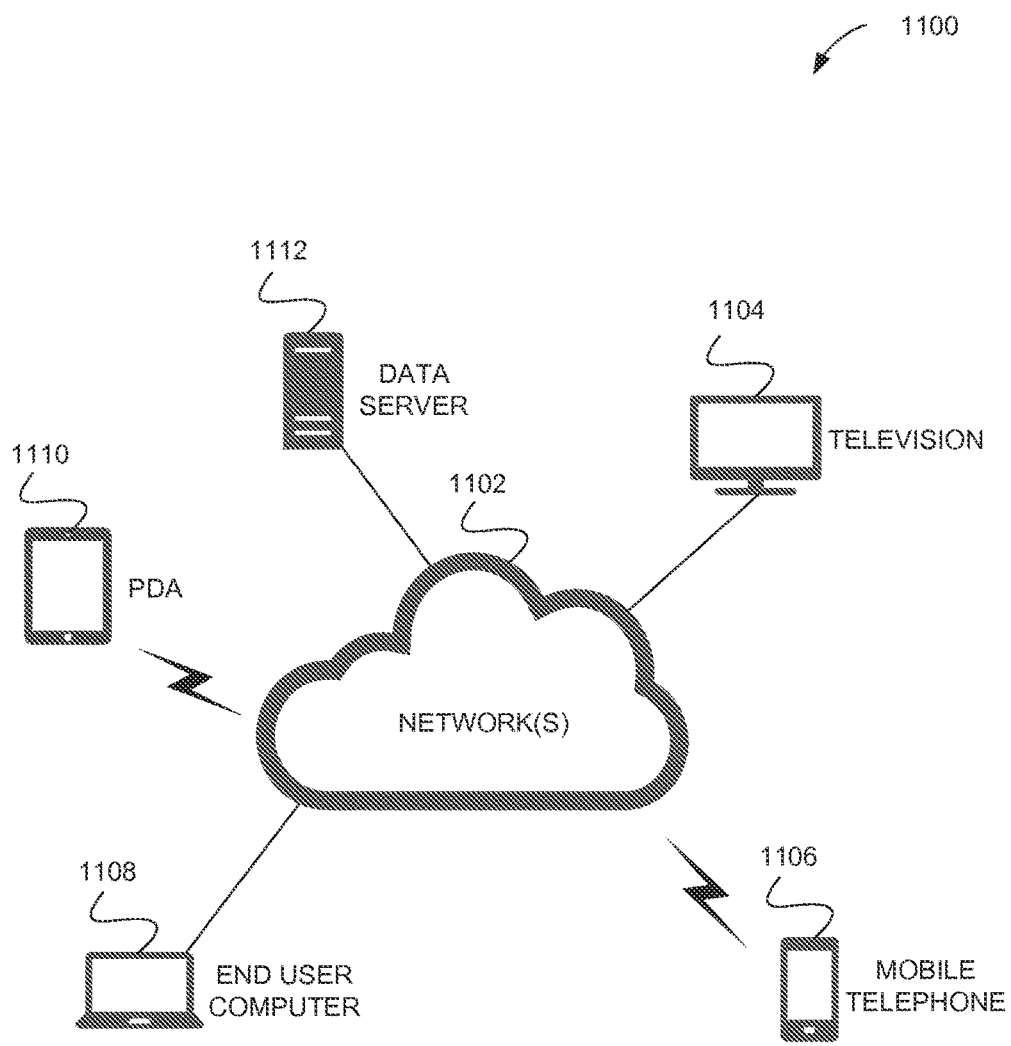
FIG. 11 illustrates a network architecture, in accordance with one possible embodiment.

FIG. 11 illustrates a network architecture 1100, in accordance with one possible embodiment. As shown, at least one network 1102 is provided. In the context of the present network architecture 1100, the network 1102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1102 may be provided.

Coupled to the network 1102 is a plurality of devices. For example, a server computer 1104 and an end user computer 1106 may be coupled to the network 1102 for communication purposes. Such end user computer 1106 may include a desktop computer, lap-top computer, and/or any other type of logic. Still yet, various other devices may be coupled to the network 1102 including a personal digital assistant (PDA) device 1108, a mobile phone device 1110, a television 1112, etc.

Figure 12:
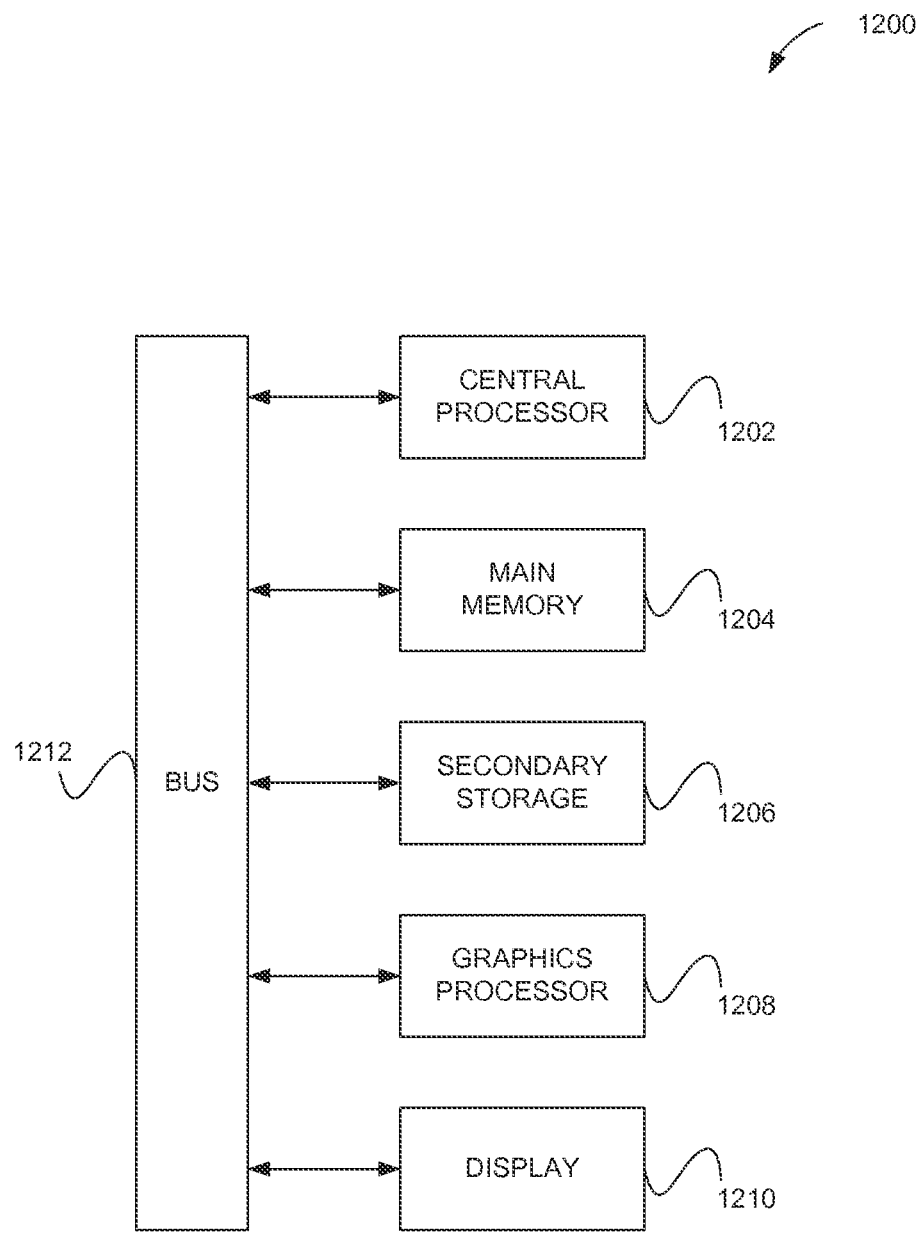
FIG. 12 illustrates an exemplary system, in accordance with one embodiment.

FIG. 12 illustrates an exemplary system 1200, in accordance with one embodiment. As an option, the system 1200 may be implemented in the context of any of the devices of the network architecture 1100 of FIG. 11. Of course, the system 1200 may be implemented in any desired environment.

As shown, a system 1200 is provided including at least one central processor 1201 which is connected to a communication bus 1202. The system 1200 also includes main memory 1204 [e.g. random access memory (RAM), etc.]. The system 1200 also includes a graphics processor 1206 and a display 1208.

The system 1200 may also include a secondary storage 1210. The secondary storage 1210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 1204, the secondary storage 1210, and/or any other memory, for that matter. Such computer programs, when executed, enable the system 1200 to perform various functions (as set forth above, for example). Memory 1204, storage 1210 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. An apparatus, comprising:
   at least one of a transmitter or a receiver; and
   circuitry in communication with the at least one of the transmitter or the receiver, the circuitry configured for communication of one or more symbols including a plurality of pilot signals and a plurality of nulls, for use in generating a plurality of coefficients;
   wherein the apparatus is configured such that at least two symbols are communicated including a first symbol including a plurality of first pilot signals and a plurality of first nulls, and a second symbol including a plurality of second pilot signals and a plurality of second nulls;
   wherein the apparatus is configured such that the first pilot signals of the first symbol are communicated on a first set of subcarriers and the second pilot signals of the second symbol are communicated on a second set of subcarriers that are mutually exclusive with respect to the first set of subcarriers;
   wherein the apparatus is configured such that the first nulls of the first symbol and the second nulls of the second symbol are also communicated on mutually exclusive sets of subcarriers.

2. The apparatus of claim 1, wherein the one or more symbols include an orthogonal frequency-division multiplexing (OFDM) symbol.

3. The apparatus of claim 1, wherein the coefficients include pre-equalizer coefficients.

4. The apparatus of claim 1, wherein the apparatus is configured such that a generation of the coefficients is facilitated through a detection of at least one of ingress noise or burst noise.

5. The apparatus of claim 1, wherein the apparatus is configured such that, for each of a plurality of subcarriers on which the first nulls and the second nulls are communicated, it is determined whether a power exceeds a threshold.

6. The apparatus of claim 1, wherein the apparatus is configured for determining whether the first symbol and the second symbol are affected by burst noise.

7. The apparatus of claim 1, wherein the apparatus is configured such that at least four symbols are communicated including the first symbol including the plurality of first pilot signals and the plurality of first nulls, the second symbol including the plurality of second pilot signals and the plurality of second nulls, a third symbol including a plurality of third pilot signals and a plurality of third nulls, and a fourth symbol including a plurality of fourth pilot signals and a plurality of fourth nulls.

8. The apparatus of claim 7, wherein the apparatus is configured such that it is determined whether one or more of the at least four symbols are affected by burst noise.

9. The apparatus of claim 1, wherein the apparatus is configured such that at least three symbols are communicated including the first symbol including the plurality of first pilot signals and the plurality of first nulls, the second symbol including the plurality of second pilot signals and the plurality of second nulls, and at least one additional symbol communicated between the first symbol and the second symbol.

10. An apparatus, comprising:
at least one of a transmitter or a receiver; and
circuitry in communication with the at least one of the transmitter or the receiver, the circuitry configured for communication of one or more symbols including a plurality of pilot signals and a plurality of nulls, for use in generating a plurality of coefficients;
wherein the apparatus is configured such that at least two symbols are communicated including a first symbol including a plurality of first pilot signals and a plurality of first nulls, and a second symbol including a plurality of second pilot signals and a plurality of second nulls;
wherein the apparatus is configured such that the first pilot signals of the first symbol are communicated on a first set of subcarriers and the second pilot signals of the second symbol are communicated on a second set of subcarriers that are mutually exclusive with respect to the first set of subcarriers;
wherein the apparatus is configured such that, for each of a plurality of subcarriers on which the first nulls and the second nulls are communicated, it is determined whether a power exceeds a threshold;
wherein the apparatus is configured such that the determination is carried out to detect ingress noise.

11. An apparatus, comprising:
at least one of a transmitter or a receiver; and
circuitry in communication with the at least one of the transmitter or the receiver, the circuitry configured for communication of one or more symbols including a plurality of pilot signals and a plurality of nulls, for use in generating a plurality of coefficients;
wherein the apparatus is configured such that at least two symbols are communicated including a first symbol including a plurality of first pilot signals and a plurality of first nulls, and a second symbol including a plurality of second pilot signals and a plurality of second nulls;
wherein the apparatus is configured such that, for each of a plurality of subcarriers on which the first nulls and the second nulls are communicated, it is determined whether a power exceeds a threshold;
wherein the apparatus is configured such that, for each of a plurality of subcarriers on which the first pilot signals and the second pilot signals are communicated, corresponding coefficients are generated based on the determination.

12. The apparatus of claim 11, wherein the apparatus is configured such that, for a subset of the subcarriers for which the corresponding coefficients are not generated, corresponding coefficients are generated based on interpolation.

13. An apparatus, comprising:
at least one of a transmitter or a receiver; and
circuitry in communication with the at least one of the transmitter or the receiver, the circuitry configured for communication of one or more symbols including a plurality of pilot signals and a plurality of nulls, for use in generating a plurality of coefficients;
wherein the apparatus is configured such that at least two symbols are communicated including a first symbol including a plurality of first pilot signals and a plurality of first nulls, and a second symbol including a plurality of second pilot signals and a plurality of second nulls;
wherein the apparatus is configured such that, for a plurality of subcarriers on which the first nulls and the second nulls are communicated, it is determined whether an average power exceeds a threshold to detect burst noise.

14. The apparatus of claim 13, wherein the apparatus is configured such that it is determined whether a first average power over the first nulls and a second average power over the second nulls each exceeds the threshold.

15. An apparatus, comprising:
at least one of a transmitter or a receiver; and
circuitry in communication with the at least one of the transmitter or the receiver, the circuitry configured for communication of one or more symbols including a plurality of pilot signals and a plurality of nulls, for use in generating a plurality of coefficients;
wherein the apparatus is configured such that at least two symbols are communicated including a first symbol including a plurality of first pilot signals and a plurality of first nulls, and a second symbol including a plurality of second pilot signals and a plurality of second nulls;
wherein the apparatus is configured such that the first pilot signals of the first symbol are communicated on a first set of subcarriers and the second pilot signals of the second symbol are communicated on a second set of subcarriers that are mutually exclusive with respect to the first set of subcarriers;
wherein the apparatus is configured for determining whether the first symbol and the second symbol are affected by burst noise;
wherein the apparatus is configured such that, if only the first symbol is affected by the burst noise, the coefficients are generated based on the second symbol.

16. An apparatus, comprising:
at least one of a transmitter or a receiver; and
circuitry in communication with the at least one of the transmitter or the receiver, the circuitry configured for communication of one or more symbols including a plurality of pilot signals and a plurality of nulls, for use in generating a plurality of coefficients;

wherein the apparatus is configured such that at least two symbols are communicated including a first symbol including a plurality of first pilot signals and a plurality of first nulls, and a second symbol including a plurality of second pilot signals and a plurality of second nulls;

wherein the apparatus is configured such that the first pilot signals of the first symbol are communicated on a first set of subcarriers and the second pilot signals of the second symbol are communicated on a second set of subcarriers that are mutually exclusive with respect to the first set of subcarriers;

wherein the apparatus is configured for determining whether the first symbol and the second symbol are affected by burst noise;

wherein the apparatus is configured such that, if both the first symbol and the second symbol are affected by the burst noise, a request is initiated for the first symbol and the second symbol to be communicated again.

17. An apparatus, comprising:

at least one of a transmitter or a receiver; and circuitry in communication with the at least one of the transmitter or the receiver, the circuitry configured for communication of one or more symbols including a plurality of pilot signals and a plurality of nulls, for use in generating a plurality of coefficients;

wherein the apparatus is configured such that at least two symbols are communicated including a first symbol including a plurality of first pilot signals and a plurality of first nulls, and a second symbol including a plurality of second pilot signals and a plurality of second nulls;

wherein the apparatus is configured such that the first pilot signals of the first symbol are communicated on a first set of subcarriers and the second pilot signals of the second symbol are communicated on a second set of subcarriers that are mutually exclusive with respect to the first set of subcarriers;

wherein the apparatus is configured such that at least four symbols are communicated including the first symbol including the plurality of first pilot signals and the plurality of first nulls, the second symbol including the plurality of second pilot signals and the plurality of second nulls, a third symbol including a plurality of third pilot signals and a plurality of third nulls, and a fourth symbol including a plurality of fourth pilot signals and a plurality of fourth nulls;

wherein the apparatus is configured such that a plurality of the at least four symbols are communicated from separate sources.

18. An apparatus, comprising:

at least one of a transmitter or a receiver; and circuitry in communication with the at least one of the transmitter or the receiver, the circuitry configured for communication of one or more symbols including a plurality of pilot signals and a plurality of nulls, for use in generating a plurality of coefficients;

wherein the apparatus is configured such that at least two symbols are communicated including a first symbol including a plurality of first pilot signals and a plurality of first nulls, and a second symbol including a plurality of second pilot signals and a plurality of second nulls;

wherein the apparatus is configured such that the first pilot signals of the first symbol are communicated on a first set of subcarriers and the second pilot signals of the second symbol are communicated on a second set of subcarriers that are mutually exclusive with respect to the first set of subcarriers;

wherein the apparatus is configured such that at least four symbols are communicated including the first symbol including the plurality of first pilot signals and the plurality of first nulls, the second symbol including the plurality of second pilot signals and the plurality of second nulls, a third symbol including a plurality of third pilot signals and a plurality of third nulls, and a fourth symbol including a plurality of fourth pilot signals and a plurality of fourth nulls;

wherein the apparatus is configured such that it is determined whether one or more of the at least four symbols are affected by burst noise;

wherein the apparatus is configured such that it is determined whether one or more subcarriers are affected by ingress noise, utilizing two or more of the at least four symbols that are determined to be unaffected by the burst noise.

19. The apparatus of claim 18, wherein the apparatus is configured such that, based on the determination whether the one or more subcarriers are affected by the ingress noise, the coefficients are generated for each of the two or more of the at least four symbols that are determined to be unaffected by the burst noise.

20. An apparatus, comprising:

at least one of a transmitter or a receiver; and circuitry in communication with the at least one of the transmitter or the receiver, the circuitry configured for:

receiving a first symbol including a plurality of first pilot signals associated with first subcarriers;

generating coefficients for the first subcarriers, utilizing the first pilot signals of the first symbol;

receiving a second symbol including a plurality of second pilot signals associated with second subcarriers; and equalizing the second subcarriers, based on the coefficients generated utilizing the first pilot signals of the first symbol, wherein the apparatus is configured such that ingress noise detection is confirmed if only a subset of the second subcarriers has a modulation error ratio less than a predetermined amount.

21. The apparatus of claim 20, wherein the apparatus is configured such that a modulation error ratio is calculated for the equalized second subcarriers.

22. An apparatus, comprising:

at least one of a transmitter or a receiver; and circuitry in communication with the at least one of the transmitter or the receiver, the circuitry configured for:

receiving a first symbol including a plurality of first pilot signals associated with first subcarriers;

generating coefficients for the first subcarriers, utilizing the first pilot signals of the first symbol;

receiving a second symbol including a plurality of second pilot signals associated with second subcarriers; and equalizing the second subcarriers, based on the coefficients generated utilizing the first pilot signals of the first symbol, wherein the apparatus is configured such that burst noise detection is confirmed if all of the second subcarriers of the second symbol has a modulation error ratio less than a predetermined amount.

23. The apparatus of claim 22, wherein the at least one of the transmitter or the receiver includes the transmitter.

24. The apparatus of claim 22, wherein the at least one of the transmitter or the receiver includes the receiver.

* * * * *